(12) United States Patent
Pitts

(10) Patent No.: US 9,514,491 B2
(45) Date of Patent: Dec. 6, 2016

(54) ASSOCIATING ANALYTICS DATA WITH AN IMAGE

(71) Applicant: Cellco Partnership, Basking Ridge, NJ (US)

(72) Inventor: Mary Christine Virginia Baynham Pitts, Oakland, CA (US)

(73) Assignee: Cellco Partnership, Basking Ridge, NJ (US)

(*) Notice: Subject to any disclaimer, the term of this patent is extended or adjusted under 35 U.S.C. 154(b) by 402 days.

(21) Appl. No.: 13/891,716

(22) Filed: May 10, 2013

(65) Prior Publication Data
US 2014/0337177 A1 Nov. 13, 2014

(51) Int. Cl.
| | | |
|---|---|---|
| G06Q 30/00 | (2012.01) | |
| G06Q 30/06 | (2012.01) | |
| G06F 17/30 | (2006.01) | |
| G06Q 50/00 | (2012.01) | |
| G06Q 20/18 | (2012.01) | |
| G06F 3/01 | (2006.01) | |
| G06F 3/048 | (2013.01) | |
| G06T 13/40 | (2011.01) | |

(52) U.S. Cl.
CPC ........... *G06Q 30/0643* (2013.01); *G06F 3/011* (2013.01); *G06F 3/017* (2013.01); *G06F 3/048* (2013.01); *G06F 17/30* (2013.01); *G06Q 20/18* (2013.01); *G06Q 30/0601* (2013.01); *G06Q 30/0623* (2013.01); *G06Q 30/0625* (2013.01); *G06Q 50/01* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 2009/0307101 A1* | 12/2009 | Ho | ...................... | G06Q 30/0601 705/26.1 |
| 2011/0112890 A1* | 5/2011 | Chu | ........................ | G06Q 30/02 705/7.33 |
| 2011/0296455 A1* | 12/2011 | Lee | ......................... | G06Q 30/00 725/32 |
| 2012/0042280 A1* | 2/2012 | Hoffman | ............ | G06F 17/30867 715/800 |

(Continued)

OTHER PUBLICATIONS

Virtual Dressing Room/Interactive Mirror Kinect, Published by NiceInteractive, Sep. 3, 2012 (Sep. 3, 2012). Accessed via https://www.youtube.com/watch?v=UhOzN2z3wtI.*

(Continued)

*Primary Examiner* — William Allen
*Assistant Examiner* — Allison Wood

(57) ABSTRACT

A device and method of capturing one or more images and determining associated interest information are provided. After receiving a data input, an item is identified based on the data input. Subsequently, an instruction to capture an image of the item is received and the image of the item is captured in response thereto. An interest level of the item is measured based on a quantity of times that the image of the item is captured and the interest information is then provided to a server device. The interest information may be used to identify an interest level trend of the item, and/or create or update a user profile that stores information regarding the item.

20 Claims, 9 Drawing Sheets

(56) References Cited

U.S. PATENT DOCUMENTS

| | | | |
|---|---|---|---|
| 2012/0233000 A1* | 9/2012 | Fisher ................... | G06Q 30/02 |
| | | | 705/14.71 |
| 2013/0202267 A1* | 8/2013 | Khromov ........... | H04N 21/2223 |
| | | | 386/225 |
| 2014/0279068 A1* | 9/2014 | Systrom ............. | G06Q 30/0277 |
| | | | 705/14.73 |

OTHER PUBLICATIONS

Cisco StyleMe Virtual Fashion Mirror, Published by Cisco, Sep. 20, 2012 (Sep. 20, 2012). Accessed via https://www.youtube.com/watch?v=u_a-jFzQFgQ.*

* cited by examiner

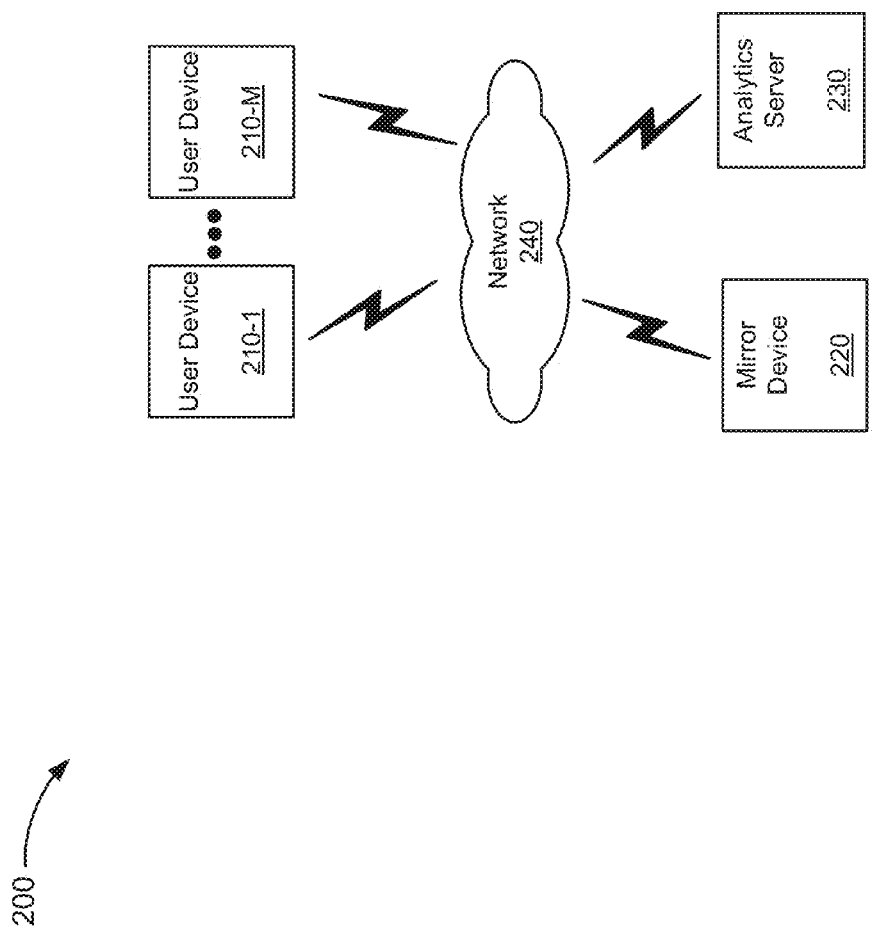

ASSOCIATING ANALYTICS DATA WITH AN IMAGE

BACKGROUND

Users sometimes use a camera device to capture an image. Manually operating a camera device can be cumbersome when the user wishes to capture an image of himself or herself.

BRIEF DESCRIPTION OF THE DRAWINGS

FIG. 2 illustrates an example environment in which systems and/or methods, described herein, may be implemented;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a device having a mirror (e.g., essentially a full length mirror) with an integrated hands-free camera device to capture an image of a user in a situation where it may be difficult for the user to manually capture the image using a manually-operated camera device. Additionally, or alternatively, the device may aid the user to orient him or herself in a particular manner prior to capturing the image (e.g., using the mirror). For example, the device may be used to capture an image of the user when the user wishes to photograph clothing merchandise at different angles while wearing the clothing merchandise (e.g., in a fitting room of a clothing merchant's facility). In some implementations, the device may be used to purchase the clothing merchandise and/or share the image (e.g., e-mail the image, provide the image to a user device, and/or publish the image to a website).

In some implementations, the device may measure user interest information in particular merchandise (e.g., automatically, such as based on a quantity of times in which the merchandise is photographed or as indicated through specific user input regarding the interest). In some implementations, the device may receive analytics information, associated with the merchandise, and/or user information. Based on the analytics information, the user information, and/or the user interest information, the device may determine trends in merchandise sales and/or may build a shopping profile for the user (e.g., to aid a user in comparison shopping, to provide targeted advertisements to the user, etc.).

Figure 1:
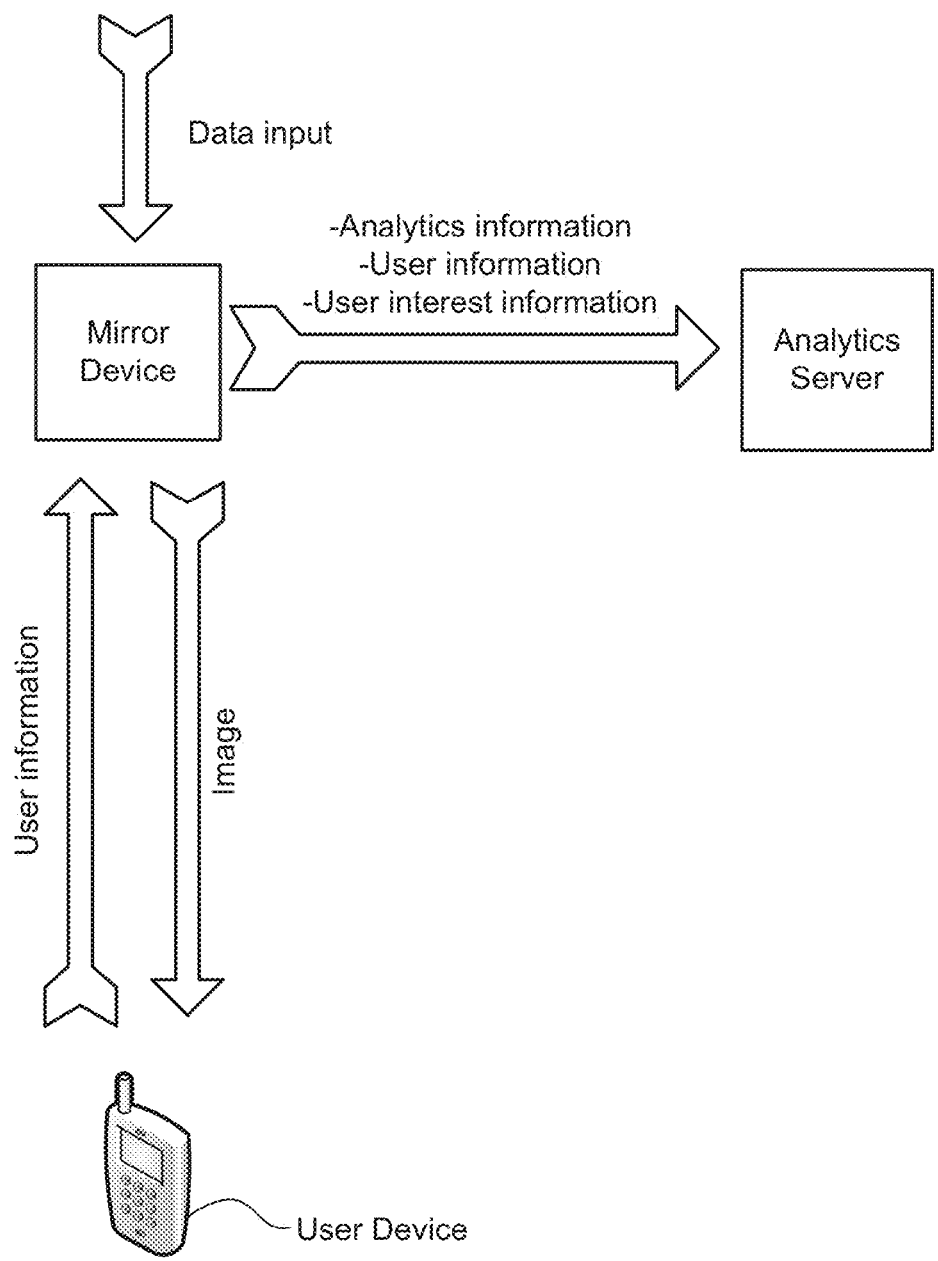
FIG. 1 illustrates an example overview of an implementation described herein.

FIG. 1 illustrates an example overview of an implementation described herein. As shown in FIG. 1, a mirror device may receive a data input to identify analytics information, associated with particular merchandise (e.g., clothing merchandise), that a user may be interested in purchasing. For example, the data input may include a barcode, a quick response (QR) code, a near-field communications (NFC) tag and/or some other information used to identify the particular merchandise. Additionally, the mirror device may receive user information of the user.

In some implementations, the mirror device may scan a barcode to identify the merchandise and to identify analytics information associated with the merchandise. Additionally, or alternatively, the mirror device may identify the merchandise using some other technique (e.g., manual input of an identifier of the merchandise). In some implementations, a user device, associated with the user, may store the user information and may provide the user information to the mirror device.

In some implementations, the mirror device may measure user interest in the merchandise based on receiving an instruction to capture an image of the merchandise, based on receiving an instruction to share the image, based on receiving an instruction to purchase the merchandise for the user, and/or based on other information. As shown in FIG. 1, the mirror device may provide the analytics information, the user information, and/or the user interest information to an analytics server. In some implementations, the analytics server may determine a correlation between the user interest information for the merchandise, the user information, and/or the analytics information. For example, the analytics server may identify user interest in the merchandise based on a location in a store in which the merchandise is located, a sales price of the merchandise, a time of day, a day of the week, demographics of potential customers (e.g., based on the user information, and/or some information). In some implementations, the analytics server may generate and/or update a user's shopping profile based on the user interest information and/or the user information. The user may be permitted to opt out of any analytics information gathered by or associated with use of the mirror device. Such an option may be presented to the user via a display on the mirror device or via the user's mobile device when coupled with the mirror device.

While the systems and/or methods are described in terms of capturing images of users in clothing merchandise and correlating user interest in the merchandise with analytics information, the systems and/or methods are not so limited. For example, the systems and/or methods may be used for other applications, such as athletic training, education training, healthcare diagnosis and recovery, building security, and/or some other application where a user may not be able to easily manually capture an image using a camera device (e.g., a camera device on a user device or a stand-alone camera device) and/or when the user may wish to use a mirror to aid in capturing the image. In some implementations, the systems and/or methods may be used to capture an image of an athlete's form/technique, and correlate the image with analytics information regarding the athlete, such as the athlete's performance statistics (e.g., to identify how a particular form/technique may affect the performance statistics).

In some implementations, the systems and/or methods may be used to capture an image for educational purposes, such as for sign-language training and/or for some other educational purpose. In some implementations, the systems and/or methods may be used to capture images relating to a medical condition (e.g., images that may identify a trend of the medical condition that progresses over time) and to correlate the images with analytics information, such as patient medical history or the like (e.g., to identify how patient medical history may affect the progression of the medical condition). In some implementations, the systems and/or methods may be used to capture an image for building security purposes. For example, the device may capture the image based on detecting motion or an alarm and may correlate the image with analytics information, such as a time that the image was captured, location of the building in which the image was captured, etc. (e.g., to increase security resources at a particular time and/or a particular location). Also, examples describing image capture may also apply to video capture.

FIG. 2 is a diagram of an example environment 200 in which systems and/or methods described herein may be implemented. As shown in FIG. 2, environment 200 may include user devices 210-1, . . . , 210-M (where M≥1), mirror device 220, analytics server 230, and network 240.

User device 210 may include a device capable of communicating via a network, such as network 240. For example, user device 210 may correspond to a mobile communication device (e.g., a smart phone or a personal digital assistant (PDA)), a portable computer device (e.g., a laptop or a tablet computer), a gaming device, a purchasing terminal, and/or another type of device. In some implementations, user device 210 may communicate with mirror device 220 to provide user information to mirror device 220, provide a data input to mirror device 220 (e.g., barcode information, an item number for merchandise, etc.), and/or provide an instruction to capture an image to mirror device 220. In some implementations, user device 210 may receive the image from mirror device 220 and/or from a server in communication with and storing images captured by mirror device 220 and may store the image and/or share the image (e.g., provide the image to another user device 210, to an image sharing website, a social networking website, a shopping profile website, or the like). In some implementations, user device 210 may receive feedback received when an image of an item was shared (e.g., a "thumbs up" rating, a "thumbs down" rating, etc.). In some implementations, user device 210 may correspond to a merchant user device 210 associated with merchant personnel. For example, user device 210 may correspond to a tablet and/or a purchasing terminal used for merchant purposes. In some implementations, the merchant user device 210 may receive an indication that particular merchandise has been purchased. In some implementations, merchant personnel may assist a customer in a merchandise checkout process when the merchant user device 210 receives an indication that the particular merchandise has been purchased. In some implementations, user device 210 may correspond to a customer's personal mobile phone or other device (e.g., to provide a data input to mirror device 220).

Mirror device 220 may include one or more computing devices having one or more mirrors with one or more embedded camera devices. In some implementations, mirror device 220 may include a panel (e.g., a display with a touch-screen input) to receive a data input, user information, an instruction to capture an image, an instruction to provide an image (e.g., to user device 210 to an image sharing website, a social networking website, a shopping profile website, or the like) and/or some other information. In some implementations, mirror device 220 may provide an image to a user device 210 that is within a particular threshold distance (e.g., using an NFC or other short-range connection) or provide the image within a particular time period of capturing the image (e.g., to prevent an unauthorized user device 210 from receiving the image).

In some implementations, mirror device 220 may include a barcode scanner to receive the data input. In some implementations, mirror device 220 may provide user interest information to analytics server 230 (e.g., an indication that an image for particular merchandise has been captured, an indication that the image has been provided to another device, an indication that the particular merchandise has been purchased, etc.). In some implementations, mirror device 220 may communicate with user device 210 and/or analytics server 230 via a machine-to-machine (M2M) connection, a near-field communication (NFC) connection, or the like.

Analytics server 230 may include one or more computing devices, such as a server device or a collection of server devices. In some implementations, analytics server 230 may receive analytics information, user information, and/or user interest information to correlate the user interest information with the user information and/or the analytics information to form correlated information. Additionally or alternatively, analytics server 230 may receive a data input to identify corresponding analytics information. In some implementations, the correlated information may be used to identify merchandise sales trends based on the analytics information. In some implementations, analytics server 230 may correlate user interest information with user information and/or analytics information for multiple users.

Network 240 may include one or more wired and/or wireless networks. For example, network 240 may include an NFC network, a wireless fidelity (WiFi) network, a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
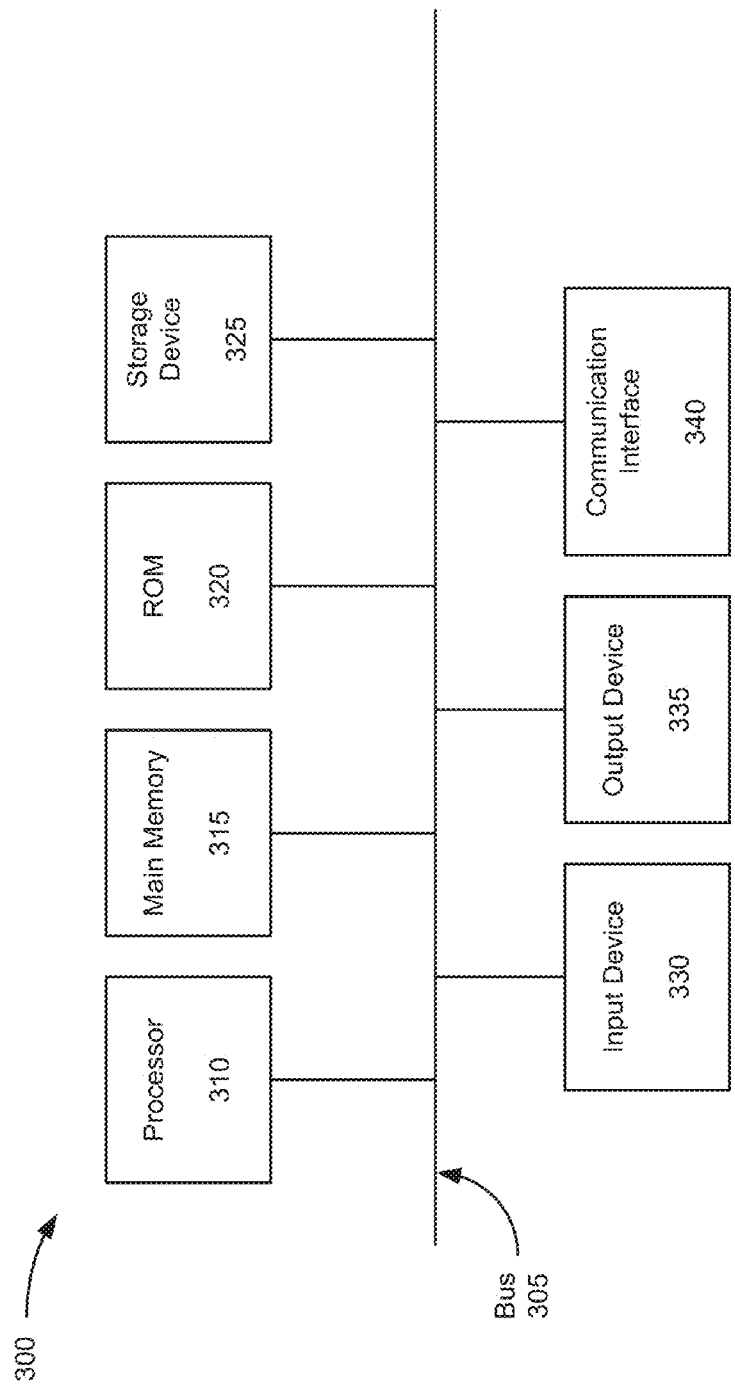
FIG. 3A illustrates example components of a device that may be used within the environment of FIG. 2.

FIG. 3A illustrates example components of a device 300 that may be used within environment 200 of FIG. 2. Device 300 may correspond to user device 210, mirror device 220, and/or analytics server 230. Each of user device 210, mirror device 220, and/or analytics server 230 may include one or more devices 300 and/or one or more components of device 300.

As shown in FIG. 3A, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3A.

Figure 3B:
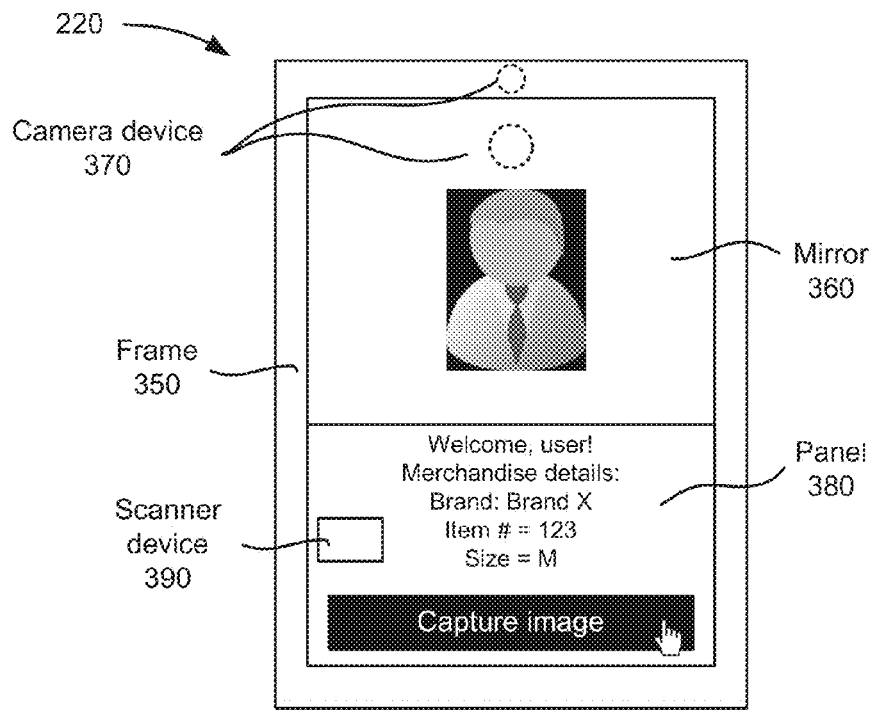
FIGS. 3B-3C illustrate example components of a mirror device.
Figure 3C:
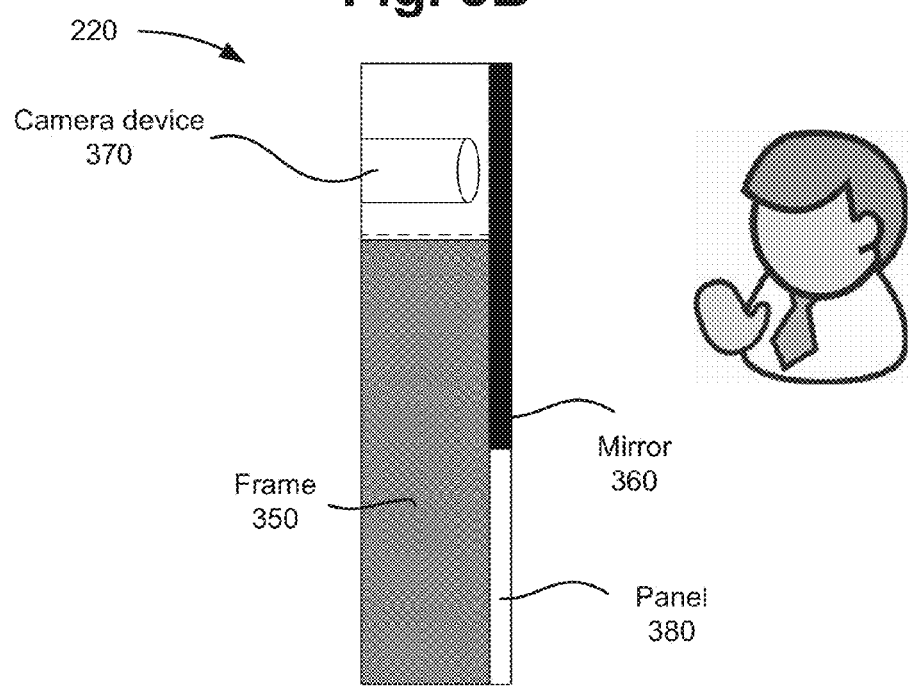

FIGS. 3B-3C illustrate example components of mirror device 220. In some implementations, mirror device 220 may include one or more components of device 300.

As shown in FIG. 3B, mirror device 220 may include frame 350, mirror 360, camera device 370, panel 380, and scanner device 390.

Frame 350 may include a housing to receive mirror 360 and restrain mirror 360 in place. As shown in FIG. 3B, frame 350 may receive camera device 370 (e.g., behind mirror 360 and/or above mirror 360 via an aperture provided in a top portion of frame 350 above mirror 360) and may include mounting components to restrain camera device 370 in place. In some implementations, frame 350 may be made from a material, such as wood, aluminum, steel, plastic, or a combination of these and/or other materials. In some implementations, frame 350 may be constructed to substantially reduce light from within frame 350, such that camera device 370 may capture an image of an object on an opposite side of mirror 360.

Mirror 360 may include a one-way reflecting surface, such as a reflecting glass coated with a half-silvered layer to reflect an image. In some implementations, mirror 360 may be provided within frame 350 and may be provided in front of camera device 370. In some implementations, mirror 360 may allow light from a front side of mirror 360 to be reflected while allowing light from a rear side of mirror 360 to pass through mirror 360 (e.g., to allow camera device 370 to capture an image of an object that is facing mirror 360 from the front side). In some implementations, mirror 360 may include a two-way reflecting surface (e.g., when camera device 370 is provided in an aperture in frame 350 above mirror 360.

Camera device 370 may include one or more image capturing devices. In some implementations, camera device 370 may be provided behind mirror 360 and may be enclosed in frame 350. In some implementations, camera device 370 may capture an image of an object that is facing mirror 360.

Panel 380 may include a touch-screen display device that may receive a user input. In some implementations, panel 380 may allow a user to provide mirror device 220 with a data input, such as information identifying particular merchandise and/or some other data input. In some implementations, panel 380 may allow a user to provide mirror device 220 with user information (e.g., a name, an address, billing information, a customer number, and/or login credentials that identify the user). In some implementations, panel 380 may allow a user to provide mirror device 220 with an instruction to capture an image, to discard an image, to provide an image for sharing, and/or to perform some other function with the image. In some implementations, panel 380 may display a captured image and may provide an option to provide the image for sharing or to discard the image. In some implementations, panel 380 may be used to modify the image once captured (e.g., enlarge the image, shrink the image, crop the image, add effects to the image, modify a color saturation of the image, etc.).

Scanner device 390 may include a barcode, a radio-frequency ID (RFID) tag reader, and/or some other type of scanning device to receive a data input. As described above, mirror device 220 may use the data input to identify merchandise information and/or some other information that may be correlated with analytics information, customer interest information, user information, and/or some other information.

FIG. 3C illustrates a side-view of mirror device 220. In FIG. 3C, a top portion of frame 350 has been removed for clarity. As shown in FIG. 3C, camera device may be mounted within frame 350 and mounted behind mirror 360 such that camera device may capture an image of an object on an opposite side of mirror 360.

In some implementations, mirror device 220 may include additional components, fewer components, different components, or differently arranged components than are shown in FIGS. 3B-3C. Also, in practice, the dimensions, proportions, and shape of the components may vary from what is shown.

Figure 4:
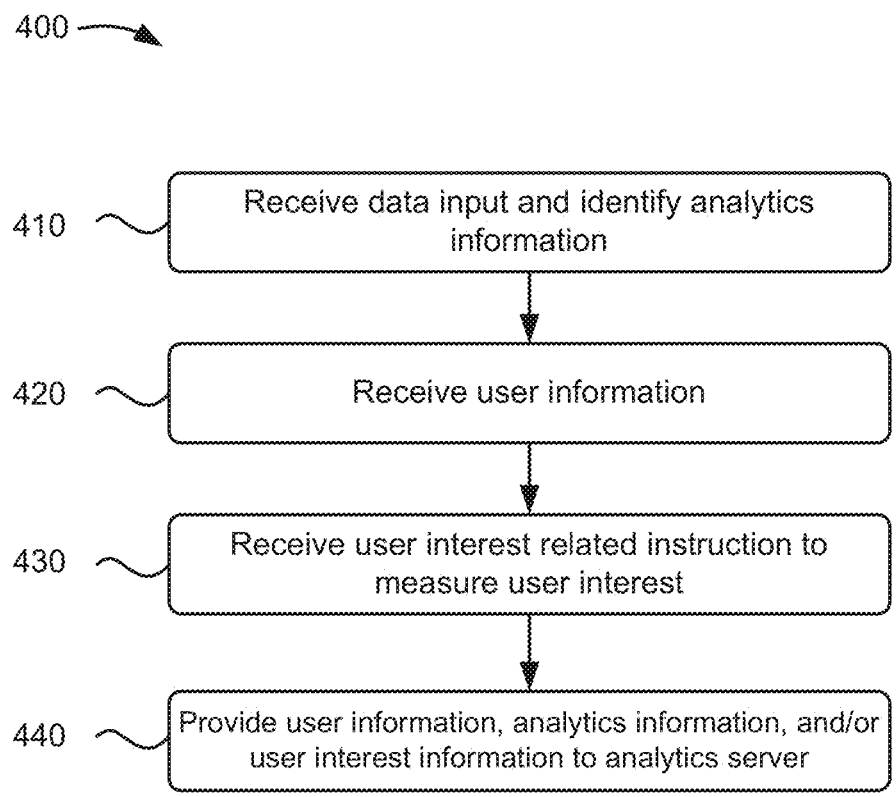
FIG. 4 illustrates a flowchart of an example process for measuring user interest in particular merchandise using a mirror device.

FIG. 4 illustrates a flowchart of an example process 400 for measuring user interest in particular merchandise using a mirror device. In one implementation, process 400 may be performed by one or more components of mirror device 220. In another implementation, some or all of blocks of process 400 may be performed by one or more components of another device in environment 200 (e.g., user device 210 or analytics server 230), or a group of devices including or excluding mirror device 220.

As shown in FIG. 4, process 400 may include receiving a data input and identifying analytics information (block 410). For example, mirror device 220 may receive a data input via scanner device 390, via panel 380, via user device 210, and/or via some other source. In some implementations, mirror device 220 may receive the data input when the user removes particular merchandise from an inventory (e.g., to photograph a trial fitting of the particular merchandise or to photograph the particular merchandise for some other purpose). For example, mirror device 220 may unlock a photographing function based on receiving the data input. In some implementations, a locking component in a fitting room may include a barcode scanner (e.g., to unlock the fitting room based on scanning a barcode) and may provide the barcode to mirror device 220.

In some implementations, the data input may include information that identifies the particular merchandise. For example, the data input may include a barcode, an item number, a description, and/or some other information that identifies the particular merchandise. In some implementations, the user may use scanner device 390 to scan a barcode to provide the data input. Additionally, or alternatively, the user may use user device 210 to scan the barcode and provide the barcode to mirror device 220 (e.g., via a network connection between user device 210 and mirror device 220, such as an NFC connection, a Bluetooth connection, and/or some other type of network connection). Additionally, or alternatively, the user may use panel 380 to provide the data input by inputting, to mirror device 220, an item number, a description, and/or some other information that identifies the particular merchandise. Additionally, or alternatively, mirror device 220 may receive the data input via some other technique.

In some implementations, mirror device 220 may identify analytics information associated with the particular merchandise. For example, mirror device 220 may store the analytics information (e.g., a location in a store in which the particular merchandise is located, a sales price of the particular merchandise, a brand name of the particular merchandise, etc.). Additionally, or alternatively, mirror device 220 may request the analytics information from a repository device (e.g., a server, associated with a merchant of the particular merchandise that stores the analytics information). For example, the request may include the information that identifies the particular merchandise. In some implementations, the analytics information may include a date and/or a time in which the data input was received (e.g., based on a clock associated with mirror device 220).

Process 400 may also include receiving user information (block 420). For example, mirror device 220 may receive the user information via panel 380 and/or via user device 210. In some implementations, user device 210 may store the user information (e.g., a shopping profile, billing information, login credentials that may be used to identify the user, etc.). In some implementations, mirror device 220 may send an instruction to user device 210 to provide the user information. In some implementations, user device 210 may display the instruction and may receive an input from the user that directs user device 210 to provide the user information to mirror device 220 (e.g., via an NFC connection, a Bluetooth connection, a WiFi connection, and/or some other type of connection). In some implementations, mirror device 220 may receive the user information via panel 380. For example, a user may input the user information via a keypad or keyboard associated with panel 380.

Process 400 may further include receiving a user interest related instruction to measure user interest (block 430). For example, mirror device 220 may receive a user interest related instruction, such as an instruction to capture an image, an instruction to provide the image to a particular destination (e.g., to user device 210, to a user shopping profile website, to a social networking website, and/or to some other location), an instruction to discard the image, an instruction to purchase the particular merchandise, and/or some other type of instruction that may be used to measure user interest in the particular merchandise. In some implementations, mirror device 220 may measure user interest to form user interest information that may be provided to analytics server 230. In some implementations, the user interest related instruction may be received from user device 210 and/or from panel 380. For example, user device 210 may include a user interface that corresponds to a user interface of panel 380.

In some implementations, mirror device 220 may capture an image based on receiving an instruction to capture the image. In some implementations, mirror device 220 may capture the image at a particular time after receiving the instruction (e.g., to allow the user time to orient in a particular manner). In some implementations, mirror device 220 may provide a countdown timer in panel 380 to indicate the amount of time remaining before the image is captured. In some implementations, mirror device 220 may provide an indication to user device 210 that the image is available to be provided to user device 210. In some implementations, user device 210 may display the indication and may receive an instruction from a user of user device 210 to direct mirror device 220 to provide the image to user device 210. In some implementations, an account of user device 210 may be charged when user device 210 receives the image or the image is sent by mirror device 220 to user device 210. In some implementations, mirror device 220 may tag the image with analytics information when providing the image. In some implementations, the image may include a global positioning system (GPS) tag that identifies a geographic location associated with the image, location data that indicates the store where the image was taken, and/or time that the image was taken.

In some implementations, mirror device 220 may provide an indication to user device 210 (e.g., a merchant user device 210) that the particular merchandise has been purchased (e.g., when mirror device 220 receives an instruction to purchase the particular merchandise for the user). In some implementations, the merchant user device 210 may receive the indication to process the purchase for the user to direct merchant personal to perform an action when the merchant user device 210 receives the indication (e.g., to remove a security tag attached to the particular merchandise, to provide the user with a bag to carry the particular merchandise, etc.).

Process 400 may also include providing the user information, the analytics information, and/or the user interest information to analytics server (block 440). For example, mirror device 220 may provide the user information, the analytics information, and/or the user interest information to analytics server 230. As described above, analytics server 230 may correlate user interest information (e.g., a measure of user interest in the particular merchandise) with the analytics information and/or the user information to form correlated information.

As described in greater detail below, analytics server 230 may use the correlated information to identify trends in user interest for the particular merchandise based on the analytics information (e.g., user interest based on a time of day, user interest based on a location in a store in which the particular merchandise is located, user interest based on a price of the particular merchandise, user interest for a particular user, user interest for multiple users, etc.). In some implementations, analytics server 230 may store and/or update a shopper profile of the user based on the user information, the analytics information, and/or the user interest.

In some implementations, analytics server 230 may generate a user interest value, corresponding to user interest in particular merchandise, based on weightings of different user interest related instructions. For example, an instruction to purchase the particular merchandise may be weighted differently (e.g., higher) than an instruction to photograph the particular merchandise. Additionally, or alternatively, an instruction to share an image of the particular merchandise to a shopper profile website may be weighted differently than an instruction share the photograph to a social networking website. In some implementations, trends of the user interest value may be correlated to analytics information.

While a particular series of blocks has been described above with regard to FIG. 4, the operations, data flows, and/or the order of the blocks may be modified in other implementations. Further, non-dependent operations and/or data flows may be performed in parallel. Also, one or more blocks may be omitted in some implementations.

Figure 5:
FIG. 5 illustrates an example data structure that may be stored by one or more devices in the environment of FIG. 2.

FIG. 5 illustrates an example data structure 500 that may be stored by one or more devices in environment 200. In some implementations, data structure 500 may be stored in a memory of analytics server 230. In some implementations, data structure 500 may be stored in a memory separate from, but accessible by, analytics server 230. In some implementations, data structure 500 may be stored by some other device in environment 200, such as user device 210 and/or mirror device 220. In some implementations, data structure 500 may be stored by another device not shown in environment 200, such as a content storage server that hosts an image sharing website, a shopping profile website, and/or some other type of content storage server.

A particular instance of data structure 500 may contain different information and/or fields than another instance of data structure 500.

As shown in FIG. 5, data structure 500 may include user interest trends field 510 and shopper profile field 520.

User interest trends field 510 may store analytics information for particular merchandise and may store corresponding user interest information. For example, user interest trends field 510 may store an item number to identify the particular merchandise, information identifying a location in a store in which the particular merchandise is located, a price for which the particular merchandise is offered for sale, and/or some other analytics information relating to the merchandise (e.g., a size of the merchandise, a color of the merchandise, a brand of the merchandise, etc.). As shown in user interest trends field 510, an item number field may store multiple instances of the same item number (e.g., when other analytics information varies for the same item number). For example, the same item may be located in different locations and/or offered for different prices at different points in time.

As further shown in FIG. 5, user interest trends field 510 may store user interest information based on the analytics information. For example, user interest trends field 510 may store information that identifies a quantity of times that an item at a particular location and particular price was photographed, a quantity of times that an image of the item was shared (e.g., when an image of the item was provided to user device 210, a server associated with a website, etc.) and/or a quantity of times that the item was purchased. In an example shown in user interest trends field 510, when item number 1 was located in location 1 and offered for sale at a price of $10, 10 images/day were captured of item number 1, 8 images were shared/day, and 3 quantities were purchased. In practice, the examples in user interest trends field 510 may vary from what is shown and described. For example, user interest trends field 510 may store user interest information based on feedback received when an image of an item was shared (e.g., a "thumbs up" rating, a "thumbs down" rating, etc.). In some implementations, the feedback may be received by a user who captured the image and/or by other users with whom the image was shared.

In some implementations, information stored by user interest trends field 510 may be used to modify sales strategies, manage staffing (e.g., salesperson staffing, security staffing, etc.), and/or for some other purpose. For example, user interest trends field 510 may allow a merchant to modify a sales price to increase profits, identify a ratio of a quantity of times that an image of a particular item was captured to a quantity of times that the particular item was purchased, modify staffing to satisfy demand of an item, and/or perform some other analysis based on information stored by user interest trends field 510.

Shopper profile field 520 may store a shopper profile for a particular user. In some implementations, shopper profile field 520 may store information to identify the particular user (e.g., the user's name, a user ID, a customer number, and/or some other information to identify the user). In some implementations, shopper profile field 520 may store information identifying one or more items (e.g., merchandise) that the user may have photographed using mirror device 220. As shown in FIG. 5, shopper profile field 520 may store an item number that identifies particular merchandise, an average price that the particular merchandise was offered for sale (e.g., when the user used mirror device 220 to scan a barcode associated with the item), one or more images of the item (e.g., images that were captured by the user using mirror device 220), a quantity of times that an image of the item was captured by the user, an indication that identifies if the item was purchased by the user (e.g., using mirror device 220 within a particular time period of receiving the data input and/or receiving an instruction to capture the image), information identifying a merchant where the image of the item was captured, and/or some other information (e.g., brand of the merchandise, size of the merchandise, etc.).

In some implementations, information stored in shopper profile field 520 may be used to provide a user with targeted promotions/advertising, credit a rewards account associated with the user, aid the user in comparison shopping, allow the user to receive reviews of merchandise, and/or used for some other purpose, some or all of which may be opted out of by the customer if desired. In some implementations, a merchant may identify a user's shopping preferences based on information stored by shopper profile field 520 to identify a pattern in the user's shopping experience (e.g., merchants that the user visited, items checked out at particular merchants, etc.). In some embodiments, identification of particular merchants may be eliminated in favor of categories of merchants.

While particular fields are shown in a particular format in data structure 500, in practice, data structure 500 may include additional fields, fewer fields, different fields, or differently arranged fields than are shown in FIG. 5. Also, as indicated above, the information stored by data structure 500 is merely an example. Other examples are possible and may differ from what is shown in FIG. 5.

Figure 6:
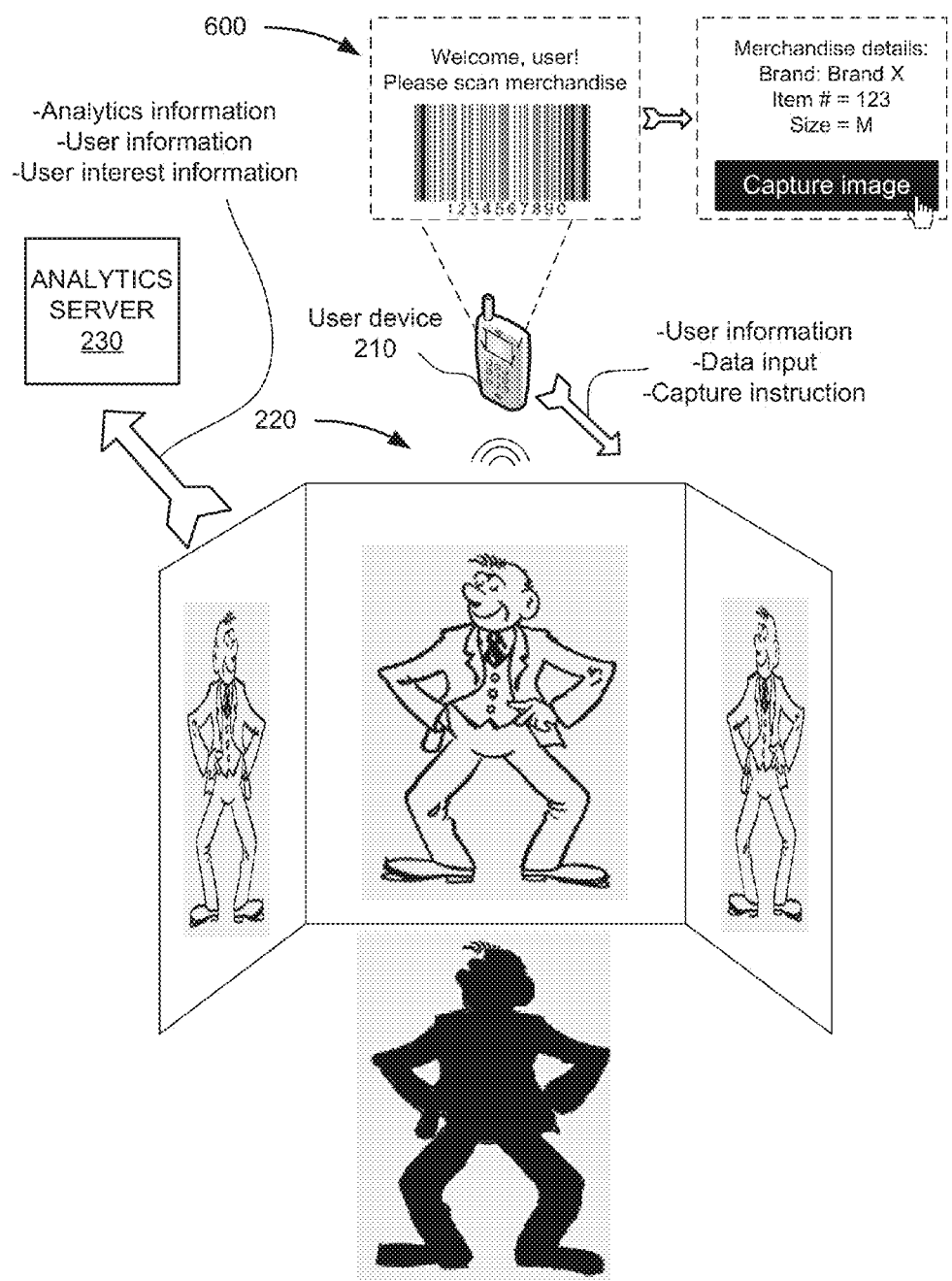
FIG. 6 illustrates an example implementation as described herein.

FIG. 6 illustrates an example implementation as described herein. As shown in FIG. 6, a user may employ user device 210 to provide user information, a data input, and a capture instruction to mirror device 220. For example, the user may employ user device 210 to provide a barcode (e.g., as shown in interface 600) corresponding to clothing merchandise that the user may wish to photograph (e.g., as part of a trial fitting). In some implementations, the user may employ user device 210 to provide mirror device 220 with the user information (e.g., based on login credentials that identify the user, based on manual input of the user information, based on information stored by user device 210, and/or based on some other information).

In some implementations, mirror device 220 may unlock an image capture function based on receiving the data input (e.g., the barcode) and/or based on receiving the user information. For example, user device 210 may receive an indication that the image capture function has been unlocked by displaying an option to capture the image. In some implementations, user device 210 may also display information regarding the clothing merchandise (e.g., based on the barcode).

As shown in FIG. 6, a user may use mirror device 220 to aid in orienting in a particular manner prior to directing mirror device 220 to capture the image. In some implementations, mirror device 220 may receive the capture instruction (e.g., via user device 210) to capture the image. As described above, mirror device 220 may capture the image at a particular time after receiving the capture instruction (e.g., to allow the user time to orient him/herself). This time may be automatically set by mirror device 220 or may be able to be provided by the user via panel 380. As shown in FIG. 6, mirror device 220 may include multiple mirrors such that multiple images may be captured, each at a different angle (and/or several from a single angle). As described above, mirror device 220 may display the captured image(s) (e.g., via panel 380) and may display an option to provide the image to user device 210 and/or to some other source (e.g., a content storage server associated with an image sharing website, a social networking website, a user shopping profile website, or the like). Additionally, or alternatively, mirror device 220 may present an option to allow the user to purchase the merchandise (e.g., based on billing information associated with the user information) and may provide a receipt to user device 210 when the merchandise is purchased (e.g., based on a self-checkout process).

As further shown in FIG. 6, mirror device 220 may provide analytics information associated with the merchandise (e.g., based on information associated with the data input), user information, and/or user interest information to analytics server 230. As described above, analytics server 230 may use the analytics information, the user information, and/or the user interest information to form correlated information to determine user interest trends in merchandise and/or to build/update a particular user's shopping profile (e.g., based on the user information).

While a particular example is shown in FIG. 6, it will be apparent that the above description is merely an example implementation. Other examples are possible and may differ from what was described with regard to FIG. 6. For example, interface 600 may be part of a panel 380 associated with mirror device 220. That is, the user may use panel 380 (instead of or in addition to using user device 210) to provide the data input, the user information, and/or the capture instruction. Also, while an example is described in terms of capturing an image of clothing merchandise and identifying user interest information of the clothing merchandise, in practice, an image of some other type of merchandise may also be captured using mirror device 220. Further, the user interest of some other type of merchandise may be identified using mirror device 220.

As described above, mirror device 220 may be used in implementations, such as athletic training, education training, healthcare diagnosis and recovery, building security, and/or some other application where a user may not be able to manually capture an image using a camera device and/or when the user may wish to use a mirror to aid in capturing the image. Additionally, mirror device 220 may correlate a captured image with analytics data to aid in an analysis. For example, mirror device 220 may capture an image of an athlete's form/technique to identify how a particular form/technique may affect performance statistics. Additionally, or alternatively, mirror device 220 may capture an image of a user to identify the user's progression with a diet and/or exercise regimen. Additionally, or alternatively, mirror device 220 may capture images relating to a medical condition to identify how a patient's medical history may affect the progression of the medical condition. Additionally, or alternatively, mirror device 220 may correlate a captured image with analytics data to aid in some other type of analysis.

Figure 7:
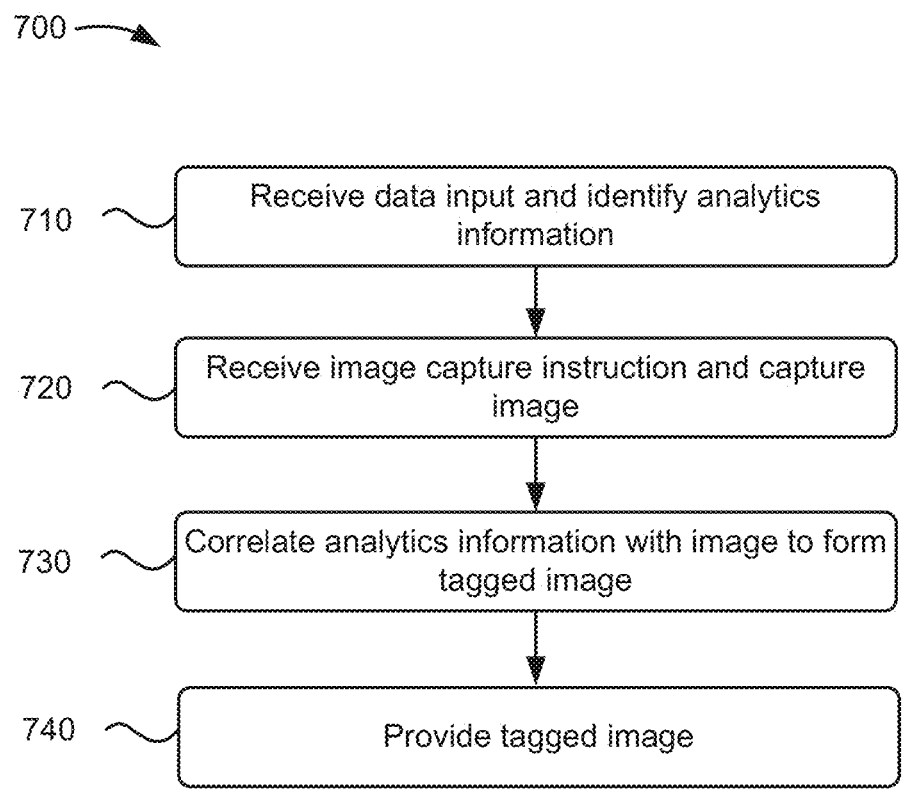
FIG. 7 illustrates a flowchart of an example process for capturing an image via a mirror device and correlating analytics data with the image.

FIG. 7 illustrates a flowchart of an example process 700 for capturing an image via a mirror device and correlating analytics data with the image. In some implementations, process 700 may be performed by one or more components of mirror device 220. In some implementations, some or all of the blocks of process 700 may be performed by one or more components of another device in environment 200 (e.g., user device 210 or analytics server 230), or a group of devices including or excluding mirror device 220.

As shown in FIG. 7, process 700 may include receiving a data input and identifying analytics information (block 710). For example, mirror device 220 may receive a data input based on a type of image to be captured by mirror device 220. In some implementations, the data input may correspond to some information that is related to the particular type of image that mirror device 220 is to capture. For example, for an implementation where mirror device 220 is to capture an image of an athlete, the data input may include the athlete's name, the athlete's sport, a barcode from a bracelet, keychain or some other item carried or worn by the athlete associated with the athlete, and/or some other information regarding the athlete. In some implementations, mirror device 220 may identify analytics information for the athlete based on the data input (e.g., the athlete's performance statistics and/or some other analytics information).

In an implementation where mirror device 220 is to capture an image of a patient's medical condition, the data input may include a barcode of an ID card associated with the patient that identifies analytics information, such as the patient's information and/or medical history. In some implementations, the data input may identify analytics information relating to another type of image that mirror device 220 is to capture (e.g., alarm data for an image relating to building security, diet/exercise data for an image relating to the progression of a user's diet/exercise regimen, etc.). In some implementations, the data input and/or analytics information may be manually provided to mirror device 220 (e.g., via panel 380 and/or user device 210).

Process 700 may also include receiving an image capture instruction and capturing the image (block 720). For example, mirror device 220 receives an image capture instruction from panel 380 and/or from user device 210. In some implementations, the image capture instruction may include a schedule that directs mirror device 220 to capture multiple images at different time intervals. In some implementations, the image capture instruction may also be received via voice command, via motion, and/or via some other technique.

Process 700 may further include correlating the analytics information with the image to form a tagged image (block 730). For example, mirror device 220 may generate a tag that includes the analytics information and may embed the tag within the image. In some implementations, the analytics information may be used to aid in an analysis. For example, the tag may identify information regarding the image, such as performance statistics for an athlete that is associated with the image (e.g., of the athlete's technique/form).

Process 700 may also include providing the tagged image (block 740). For example, mirror device 220 may provide the tagged image to user device 210, to analytics server 230, and/or to some other source (e.g., a content server associated with an image sharing website, a user profile website, a social networking website, or the like). In some implementations, mirror device 220 may provide the tagged image based on receiving an instruction to provide the tagged image (e.g., from panel 380 and/or user device 210).

While a particular series of blocks has been described above with regard to FIG. 7, the operations, data flows, and/or the order of the blocks may be modified in other implementations. Further, non-dependent operations and/or data flows may be performed in parallel. Also, one or more blocks may be omitted in some implementations.

Figure 8A:
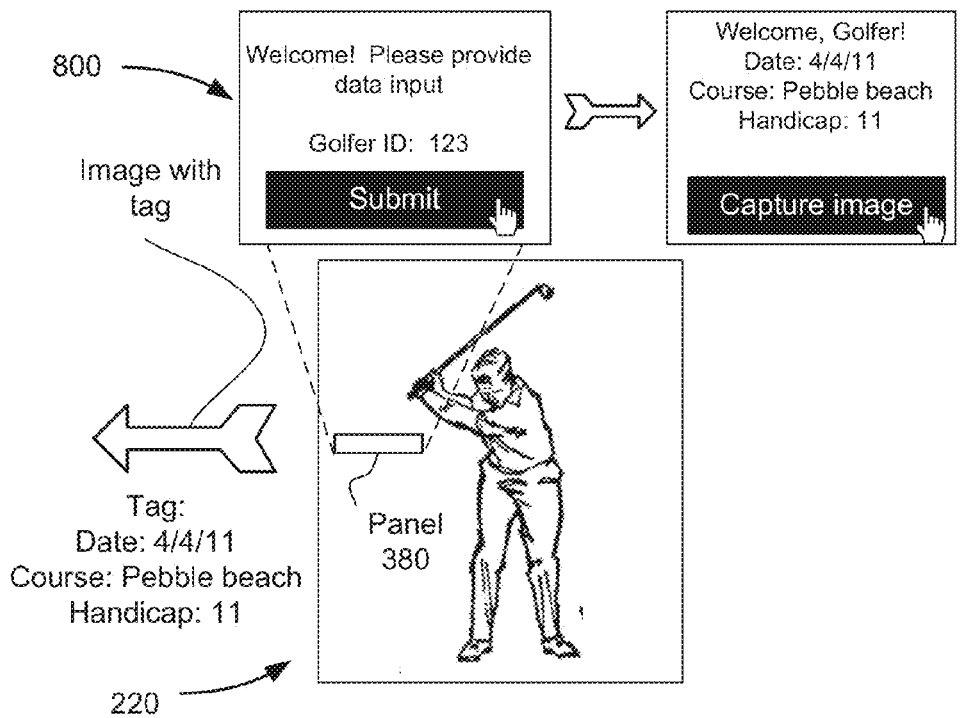
FIGS. 8A-8B illustrate an example implementation as described herein.
Figure 8B:
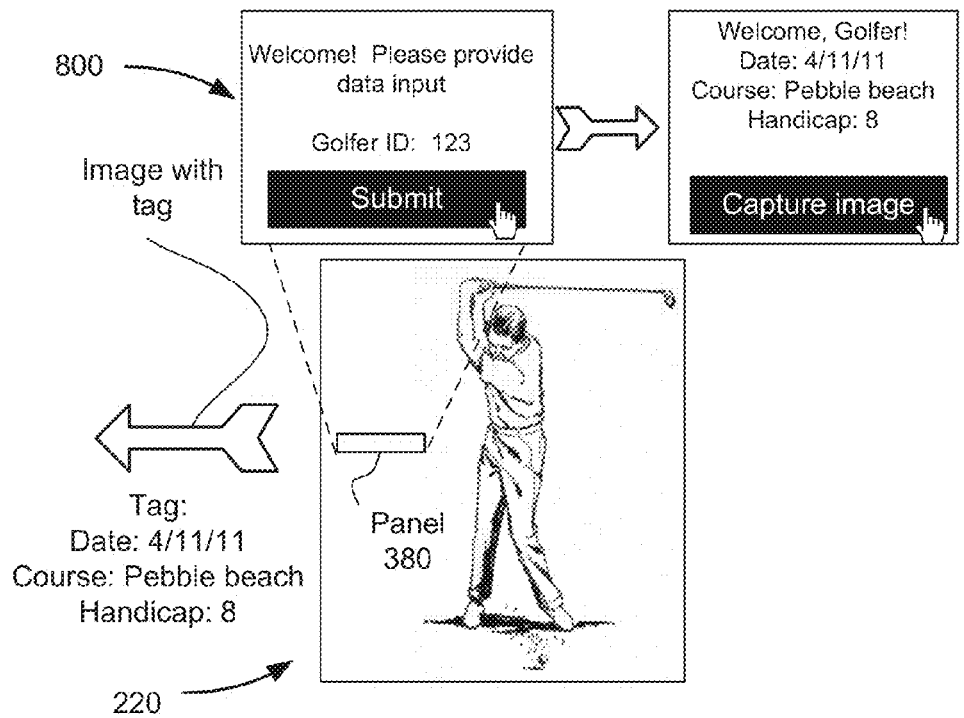

FIGS. 8A-8B illustrate an example implementation as described herein. As shown in FIG. 8A, mirror device 220 may receive a data input, such as an ID of an athlete, (e.g., an ID of a golfer). As shown in interface 800, mirror device 220 may receive the data input via panel 380. As described above, mirror device 220 may receive the data input via user device 210 and may receive the data input in some other form (e.g., a barcode, etc.). In some implementations, mirror device 220 may identify analytics information based on the data input. For example, mirror device 220 may identify the name of the particular athlete, and performance statistics of the particular athlete (e.g., the athlete's most recent handicap statistic, a course relating to the statistic, a date associated with the statistic, and/or some other information regarding a performance statistic associated with the athlete). For example, the analytics information may be stored by mirror device 220 and/or stored by a repository that mirror device 220 may access (e.g., a scoring system that stores the athlete's performance statistics). In some implementations, the analytics information may be manually provided to mirror device 220 (e.g., via panel 380 and/or via user device 210).

In some implementations, mirror device 220 may receive an instruction to capture an image (e.g., an image of a technique/form of the athlete, such as a technique/form of the athlete's golf swing that corresponds to the athlete's most recent handicap statistic associated with the athlete's most recent round of golf). For example, assume that the athlete uses mirror device 220 to capture an image of the athlete's golf swing that the athlete used in the athlete's most recent round of golf. In some implementations, mirror device 220 may capture the image and may embed a tag in the image that identifies the analytics information. In some implementations, mirror device 220 may provide the tagged image (e.g., to user device 210 and/or to some other location).

As described above, the tagged image may be used to aid in an analysis. For example, an athlete may use the tagged image to determine how a particular technique, such as a particular golf swing, affects the athlete's performance statistics (e.g., a golfer's handicap at a particular course). In the example shown in FIG. 8A, mirror device 220 may capture an image of the athlete's golf swing and may correlate the image (e.g., by the tagging the image) with the athlete's recent performance statistics (e.g., a handicap of 11 at the course "Pebble beach" on the date, Apr. 4, 2011). As a result, the athlete may analyze how the golf swing, shown in FIG. 8A, affects the athlete's handicap statistic.

Referring to FIG. 8B, assume that at a later time, the athlete alters the golf swing and that an updated handicap statistic for the athlete is made available to mirror device 220 (e.g., when the athlete plays a subsequent round of golf). As shown in FIG. 8B, mirror device 220 may receive a data input (e.g., the ID of the athlete) and may identify analytics information of the athlete (e.g., the athlete's most recent handicap statistic). Further, mirror device 220 may receive an instruction to capture an image (e.g., an image relating to the athlete's golf swing associated with the updated handicap statistic) and to correlate the analytics information (e.g., the athlete's recent handicap statistic) with the image (e.g., by tagging the image with the analytics information). As shown in FIG. 8B, mirror device 220 may provide the tagged image to aid in an analysis. As a result, the athlete may analyze how the golf swing, shown in FIG. 8B, affects the athlete's handicap statistic in relation to how the golf swing, shown in FIG. 8A, affects the athlete's handicap statistic. As shown in FIG. 8B, the athlete's handicap statistic reduced in relation to the athlete's handicap statistic in FIG. 8A (e.g., the handicap statistic reduced from 11 to 8), thereby allowing the athlete to adjust the golf swing based on the image captured by mirror device 220.

In some implementations, mirror device 220 may provide the tagged image without receiving an instruction from the athlete to capture the tagged image. For example, mirror device 220 may be located at a golf course, a gym, or the like and may capture an image of the athlete's form based on motion detection (e.g., after receiving a data input that identifies the athlete). In some implementations, mirror device 220 may receive real-time performance statistics (e.g., from a scoring system and/or from a repository that logs and stores performance statistics) and may tag the captured image of the athlete with the performance statistics. In some implementations, mirror device 220 may provide the tagged image to a user device 210 associated with the athlete based on capturing the image (e.g., using motion detection) and correlating the captured image with real-time performance statistic.

While a particular example is shown in FIGS. 8A-8B, it will be apparent that the above description is merely an example implementation. Other examples are possible and may differ from what was described with regard to FIGS. 8A-8B.

As described above, mirror device 220 may measure user interest in merchandise based on the receiving an instruction to capture an image of the merchandise, based on the receiving an instruction to share the image, based on receiving an instruction to purchase the merchandise for the user, and/or based on some other information. In some implementations, mirror device 220 may provide analytics information, user information, and/or the user interest information to analytics server 230. In some implementations, analytics server 230 may determine a correlation between the user interest information for the merchandise, the user information, and/or the analytics information. For example, analytics server 230 may identify user interest in the merchandise based on a location in a store in which the merchandise is located, a sales price of the merchandise, a time of day, a day of the week, demographics of potential customers (e.g., based on the user information), and/or some information). In some implementations, analytics server 230 may generate and/or update a user's shopping profile based on the user interest information and/or the user information.

In some implementations, mirror device 220 may receive a data input to identify the merchandise. In some implementations, the data input may correspond to a time in which particular merchandise has been removed from an inventory (e.g., when a barcode of the particular merchandise is scanned when a user check outs the particular merchandise for a trial fitting). In some implementations, the data input may be used to identify real-time inventory of merchandise, to compare an expected inventory level with an actual inventory level, and to identify conditions when discrepancies between the expected inventory level and the actual inventory level are identified (e.g., to identify potential thefts when a discrepancy exists and to identify when the potential thefts occurred, locations in a store in which the thefts occurred, etc.). In some implementations (e.g., when the barcode of the particular merchandise is scanned but the particular merchandise is not purchased), the real-time inventory may reflect that the particular merchandise has been returned to inventory (e.g., after a particular amount of time has elapsed since the barcode was scanned).

In some implementations, mirror device 220 may capture an image of an individual (e.g., based on the individual scanning an ID to enter a facility) such that the captured image of the individual may be compared to an image associated with the ID to enter the facility.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a mirror device, a data input,
     the data input being received via a scanner device included in the mirror device;
   identifying, by the mirror device, an item based on the data input;
   receiving, by the mirror device, an instruction to capture an image of the item,
     the instruction including at least one of:
       a voice command, or
       a motion;
   capturing, by the mirror device, the image of the item based on receiving the instruction,
     the image of the item being captured using a hands-free camera device and a mirror that are included in the mirror device;
   obtaining, by the mirror device, analytics information relating to the item,
     the analytics information being obtained from a first server device,
     the analytics information including information identifying a location of the item, and
     the analytics information being associated with an interest level of the item,
       the interest level being based on a quantity of times that the image of the item is captured;
   forming, by the mirror device, a tagged image using the image and the analytics information; and
   providing, by the mirror device, the tagged image to a second server device.

2. The method of claim 1, wherein the mirror includes a one-way reflecting surface that reflects the image of the item, and
   wherein the image of the item is captured through the mirror.

3. The method of claim 1, wherein the mirror device comprises a panel through which the data input is received.

4. The method of claim 1, wherein the data input includes a barcode or an identifier of the item.

5. The method of claim 1, further comprising:
   generating an association between interest information, associated with the interest level, and the analytics information to form correlated information,
     the analytics information being obtained based on the data input; and
   providing the correlated information to the second server device.

6. The method of claim 1, further comprising:
   receiving information regarding a user associated with the item;
   generating an association between interest information, associated with the interest level, and the information regarding the user to form correlated information; and
   providing the correlated information to the second server device.

7. The method of claim 1, further comprising:
   receiving an instruction to provide the image through a network,
     wherein the interest level is further based on a quantity of times that the instruction to provide the image through the network is received.

8. The method of claim 1, further comprising:
providing an option to purchase the item.

9. A mirror device comprising:
a mirror,
a scanner device,
a hands-free camera device, and
one or more processors to:
  receive a data input using the scanner device;
  identify an item based on the data input;
  receive an instruction to capture an image of the item,
    the instruction including at least one of:
      an audible command, or
      a motion;
  capture the image of the item, via the hands-free camera device and the mirror, based on the instruction,
    the mirror being used to aid in capturing the image of the item;
  obtain, from a first server device, analytics information relating to the item,
    the analytics information including information identifying a location of the item,
  analyze information associated with the item to measure an interest level of the item,
    the information associated with the item including a quantity of times that the image of the item is captured; and
  provide, to a second server device, the analytics information and interest information, associated with the interest level, to permit the second server device to use the interest information to:
    identify an interest level trend of the item or
    create or update a user profile that stores information regarding the item.

10. The mirror device of claim 9, further comprising a panel through which the data input is received.

11. The mirror device of claim 9, wherein the data input includes a barcode or an identifier of the item.

12. The mirror device of claim 9, wherein the one or more processors are further to:
  generate an association between the interest information and the analytics information to form correlated information; and
  provide the correlated information to the second server device.

13. The mirror device of claim 9, wherein the one or more processors are further to:
  receive information regarding a user associated with the item;
  generate an association between the interest information and the information regarding the user to form correlated information; and
  provide the correlated information to the second server device.

14. The mirror device of claim 9, wherein the one or more processors are further to:
  provide an option to purchase the item.

15. A non-transitory computer-readable medium for storing instructions, the instructions comprising:
  a plurality of instructions which, when executed by one or more processors of a mirror device, cause the one or more processors to:
    receive a data input;
    identify an item based on the data input;
    receive an image capture instruction to capture an image of the item,
      the image capture instruction including at least one of:
        a voice command, or
        a motion, and
      the image of the item including an image reflected by a mirror of the mirror device;
    capture the image of the item, via a hands-free camera device of the mirror device and the mirror, based on the image capture instruction;
    identify analytics information relating to the item;
    analyze information associated with the item to measure an interest level of the item,
      the information, associated with the item, including a quantity of times that the image of the item is captured; and
    provide, to a server device, the analytics information and interest information, associated with the interest level, to permit the server device to use the interest information for at least one of:
      identification of an interest level trend of the item, or
      creation or updating of a user profile that stores information regarding the item.

16. The non-transitory computer-readable medium of claim 15, wherein the mirror includes a one-way reflecting surface or a two-way reflecting surface that reflects the image of the item.

17. The non-transitory computer-readable medium of claim 15, wherein the mirror device comprises a panel or scanner through which the data input is received.

18. The non-transitory computer-readable medium of claim 15, wherein the plurality of instructions further cause the one or more processors to:
  generate an association between the interest information and the analytics information to form correlated information; and
  provide the correlated information to the server device.

19. The non-transitory computer-readable medium of claim 15, wherein the plurality of instructions, when executed by one or more processors, further cause the one or more processors to:
  receive information regarding a user associated with the item;
  generate an association between the interest information and the information regarding the user to form correlated information; and
  provide the correlated information to the server device.

20. The non-transitory computer-readable medium of claim 15, wherein the plurality of instructions, when executed by one or more processors, further cause the one or more processors to:
  provide an option to purchase the item.

* * * * *